(12) United States Patent
Miyachi (10) Patent No.: US 11,225,229 B2
(45) Date of Patent: Jan. 18, 2022

(54) BRAKING DEVICE FOR VEHICLE

(71) Applicant: ADVICS CO., LTD., Kariya (JP)

(72) Inventor: Akinori Miyachi, Kariya (JP)

(73) Assignee: ADVICS CO., LTD., Kariya (JP)

( * ) Notice: Subject to any disclaimer, the term of this patent is extended or adjusted under 35 U.S.C. 154(b) by 218 days.

(21) Appl. No.: 16/486,849

(22) PCT Filed: Mar. 29, 2018

(86) PCT No.: PCT/JP2018/013386
§ 371 (c)(1),
(2) Date: Aug. 19, 2019

(87) PCT Pub. No.: WO2018/181785
PCT Pub. Date: Oct. 4, 2018

(65) Prior Publication Data
US 2020/0010063 A1   Jan. 9, 2020

(30) Foreign Application Priority Data
Mar. 31, 2017   (JP) ............................. JP2017-070489

(51) Int. Cl.
*B60T 8/17* (2006.01)
*G10K 11/175* (2006.01)
*B60T 15/02* (2006.01)

(52) U.S. Cl.
CPC ............ *B60T 8/17* (2013.01); *G10K 11/1752* (2020.05); *B60T 15/025* (2013.01)

(58) Field of Classification Search
CPC .......... B60T 8/17; B60T 8/3275; B60T 8/404; B60T 8/173; B60T 15/025; B60T 13/662; B60T 13/166; G10K 11/1752; H01F 7/18
See application file for complete search history.

(56) References Cited

U.S. PATENT DOCUMENTS

| | | | |
|---|---|---|---|
| 6,315,369 B1 * | 11/2001 | Hirose | B60T 8/404 303/10 |
| 8,256,849 B2 * | 9/2012 | Kokubo | B60T 8/36 303/119.1 |
| 2002/0116177 A1 * | 8/2002 | Bu | G10L 15/20 704/200.1 |
| 2010/0066164 A1 * | 3/2010 | Kokubo | B60T 8/4872 303/191 |
| 2011/0123037 A1 * | 5/2011 | L'Esperance | H04K 3/825 381/73.1 |

(Continued)

OTHER PUBLICATIONS

International Search Report dated Jun. 26, 2018 in PCT/JP2018/013386 filed on Mar. 29, 2018.

*Primary Examiner* — Jelani A Smith
*Assistant Examiner* — Alexander C. Bost
(74) *Attorney, Agent, or Firm* — Oblon, McClelland, Maier & Neustadt, L.L.P.

(57) ABSTRACT

The braking device is provided with an electromagnetic valve, which is an example of a device to be controlled, and a valve control unit for driving the electromagnetic valve by means of PWM control. When driving the electromagnetic valve by inputting a drive signal to the electromagnetic valve, the valve control unit changes the frequency of the drive signal within a frequency range. Note that the width of the frequency range is set on the basis of the minimum audible field among equal-loudness contours.

19 Claims, 6 Drawing Sheets

(56) References Cited

U.S. PATENT DOCUMENTS

| | | | | |
|---|---|---|---|---|
| 2014/0309904 A1* | 10/2014 | Ko | ............................ | B60T 8/36 |
| | | | | 701/78 |
| 2017/0323628 A1* | 11/2017 | Valeri | ................ | G10K 11/1752 |
| 2018/0162341 A1* | 6/2018 | Irwan | .................... | B60T 8/4872 |
| 2018/0166061 A1* | 6/2018 | Kotegawa | .......... | G10K 11/1752 |

* cited by examiner

BRAKING DEVICE FOR VEHICLE

TECHNICAL FIELD

The present invention relates to a braking device for a vehicle configured to adjust braking force for a wheel.

BACKGROUND ART

As a braking device for a vehicle, known is a braking device including a plurality of electromagnetic valves provided on a fluid pressure circuit arranged between a master cylinder and a wheel cylinder. In the braking device, drive of the electromagnetic valve is controlled when adjusting a fluid pressure in the wheel cylinder, i.e., braking force for a wheel.

In the meantime, the electromagnetic valve may be driven by pulse width control (also referred to as "PWM control"). In a braking device disclosed in PTL 1, in order to lower a sound pressure level of noise caused due to the drive of the electromagnetic valve, a frequency of a drive signal that is input to the electromagnetic valve when driving the electromagnetic valve is continuously changed. Thereby, as compared to a case in which the frequency of the drive signal is fixed to a constant value, it is possible to lower the sound pressure level of the noise.

CITATION LIST

Patent Literature

PTL 1: US-A-2014/0309904

SUMMARY OF INVENTION

Technical Problem

When the frequency of the drive signal that is input to the electromagnetic valve is varied, as described above, a plurality of types of noises having different frequencies are generated from the electromagnetic valve. When a passenger in the vehicle hears the plurality of types of noises, the passenger may feel discomfort.

Therefore, in order to prevent the passenger from feeling discomfort or to further reduce the feeling of discomfort to be given to the passenger when varying the frequency of the drive signal that is input to the electromagnetic valve, as disclosed in PTL 1, there is room for improvement in terms of devising a method of varying the frequency.

Solution to Problem

In order to solve the above problem, a braking device for a vehicle configured to adjust braking force for a vehicle includes an electric control target and a target control unit configured to drive the control target by pulse width control. When driving the control target by inputting a drive signal to the control target, the target control unit varies a frequency of the drive signal within a frequency domain. A width of the frequency domain is set on the basis of a minimum audible field curve of equal loudness curves.

A sound pressure level, which corresponds to the frequency of the drive signal to be input to the control target, of a prescribed sound pressure levels that are sound pressure levels indicated by the minimum audible field curve of the equal loudness curves is referred to as a specific sound pressure level. In this case, when the specific sound pressure level is relatively high, the noise is less audible to the passenger in the vehicle even in the case that the sound pressure level of the noise generated from the control target is relatively high. On the other hand, when the specific sound pressure level is relatively low, the noise is easily audible to the passenger in the vehicle even in the case that the sound pressure level of the noise generated from the control target is relatively low.

Therefore, in the above configuration, the frequency of the drive signal that is to be input to the control target is varied within the frequency domain. Furthermore, the width of the frequency domain is set on the basis of the minimum audible field curve. For example, when the frequency domain is set to a domain in which the prescribed sound pressure levels, which are sound pressure level indicated by the minimum audible field curve, are low, the frequency domain is set so that the width of the frequency domain is greater, as compared to a case in which the frequency domain is set to a domain in which the prescribed sound pressure levels are high. In this way, the frequency of the drive signal is varied within the frequency domain set to take the prescribed sound pressure levels into consideration, so that it is possible to reduce a difference between the sound pressure level of the noise and the prescribed sound pressure level even in the case that the sound pressure level of the noise is set to the prescribed sound pressure level or lower or the sound pressure level of the noise becomes higher than the prescribed sound pressure level.

Therefore, the frequency of the drive signal is varied within the frequency domain set on the basis of the minimum audible field curve, so that it is possible to prevent the passenger in the vehicle from feeling discomfort, which is caused due to the drive of the control target, or to further reduce the feeling of discomfort to be given to the passenger.

DESCRIPTION OF EMBODIMENTS

First Embodiment

Hereinafter, a first embodiment of a braking device for a vehicle is described with reference to FIGS. 1 to 6.

Figure 1:
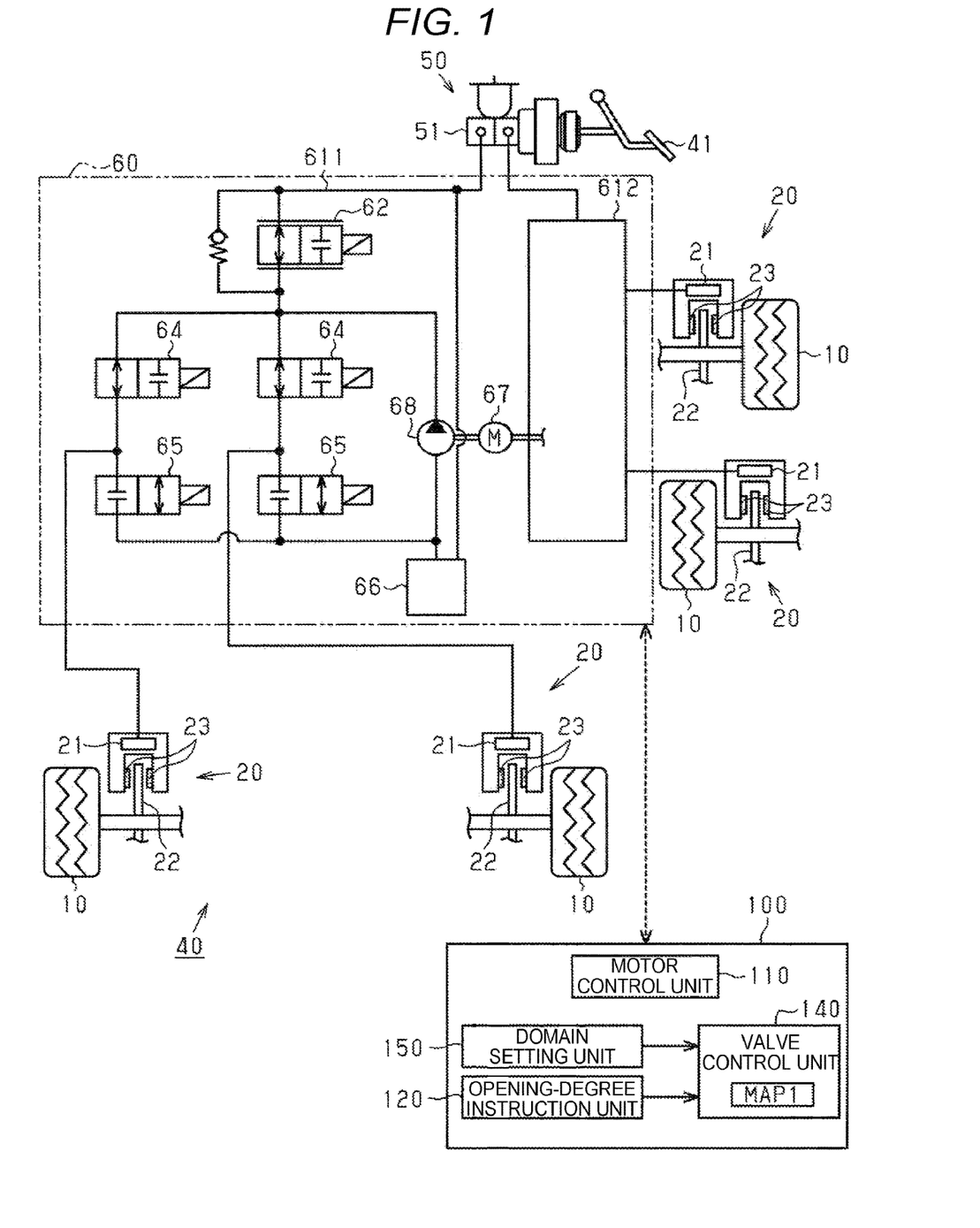
FIG. 1 is a configuration view depicting an outline of a braking device for a vehicle of a first embodiment.

A vehicle shown in FIG. 1 includes a plurality of braking mechanisms 20 (the number thereof is the same as the number of wheels) individually provided for a plurality of wheels 10, and a braking device 40 of the first embodiment.

As shown in FIG. 1, each braking mechanism 20 includes a wheel cylinder 21 to which a brake fluid is to be supplied, a disc rotor 22 configured to rotate integrally with the wheel 10, and a friction material 23 configured to relatively move toward and away from the disc rotor 22. In each braking mechanism 20, as a WC pressure Pwc, which is a fluid pressure in the wheel cylinder 21, increases, force of pressing the friction material 23 to the disc rotor 22, i.e., braking force for the wheel 10 increases.

The braking device 40 includes a fluid pressure generation device 50 coupled with a braking operation member 41 such as a brake pedal to be operated by a driver, and a braking actuator 60 capable of individually adjusting the WC pressure Pwc in each wheel cylinder 21.

The braking actuator 60 has two systems of fluid pressure circuits 611, 612. The first fluid pressure circuit 611 is connected with two wheel cylinders 21 of the respective wheel cylinders 21. Also, the second fluid pressure circuit 612 is connected with two remaining wheel cylinders 21.

The first fluid pressure circuit 611 is provided with a differential pressure adjusting valve 62 for adjusting a differential pressure between a master cylinder 51 of the fluid pressure generation device 50 and the wheel cylinder 21, a holding valve 64 that is closed when regulating an increase in WC pressure Pwc, and a pressure reducing valve 65 that is opened when reducing the WC pressure Pwc. The differential pressure adjusting valve 62 is a normally-opened type linear electromagnetic valve, the holding valve 64 is a normally-opened type electromagnetic valve, and the pressure reducing valve 65 is a normally-closed type electromagnetic valve. Also, the first fluid pressure circuit 611 is connected with a reservoir 66 configured to temporarily reserve therein a brake fluid flowing out from the wheel cylinder 21 through the pressure reducing valve 65, and a pump 68 configured to be actuated on the basis of drive of an electric motor 67. The pump 68 is actuated when adjusting the WC pressure Pwc.

In the meantime, since a structure of the second fluid pressure circuit 612 is substantially the same as the structure of the first fluid pressure circuit 611, the description of the structure of the second fluid pressure circuit 612 is herein omitted.

Subsequently, a control device 100 of the braking device 40 is described with reference to FIGS. 1 to 6.

As shown in FIG. 1, the control device 100 includes, as functional units for controlling the braking actuator 60, a motor control unit 110, an opening-degree instruction unit 120, a domain setting unit 150, and a valve control unit 140, which is an example of a target control unit.

The motor control unit 110 is configured to control drive of the electric motor 67, i.e., an ejection amount of the brake fluid of the pump 68.

The opening-degree instruction unit 120 is configured to individually set opening-degree instruction values Z for the differential pressure adjusting valve 62, the holding valve 64 and the pressure reducing valve 65.

The domain setting unit 150 is configured to set a frequency domain X on the basis of a frequency of a drive signal DSV that is to be input to the differential pressure adjusting valve 62, the holding valve 64 and the pressure reducing valve 65 when starting the differential pressure adjusting valve 62, the holding valve 64 and the pressure reducing valve 65. That is, when the frequency of the drive signal DSV, which is to be input when starting the differential pressure adjusting valve 62, the holding valve 64 and the pressure reducing valve 65, is set as a start frequency, the domain setting unit 150 sets the frequency domain X in which a frequency obtained by subtracting a predetermined frequency from the start frequency is set as a lower limit and a frequency obtained by adding the predetermined frequency to the start frequency is set as an upper limit. Meanwhile, in descriptions below, a frequency, which is a center of the frequency domain X, is referred to as 'variation center frequency Ys', the frequency of the lower limit of the frequency domain X is referred to as 'variation lower limit frequency Ydl' and the frequency of the upper limit of the frequency domain X is referred to as 'variation upper limit frequency Yul'.

The valve control unit 140 is configured to drive the electromagnetic valves 62, 64, 65 as the control target by means of pulse width control (hereinbelow, also referred to as "PWM control") based on the opening-degree instruction values Z set by the opening-degree instruction unit 120. "PWM" is an abbreviation of "Pulse Width Modulation". That is, when starting the electromagnetic valves 62, 64, 65, the valve control unit 140 determines the start frequency on the basis of a situation (for example, a traveling state of the vehicle) and the like at that time, and generates the drive signal DSV having the same frequency as the start frequency. Then, the valve control unit 140 inputs the generated drive signal DSV to the electromagnetic valves 62, 64, 65, thereby driving the electromagnetic valves 62, 64, 65.

In the first embodiment, after inputting the drive signal DSV having the same frequency as the start frequency to the electromagnetic valves 62, 64, 65, the valve control unit 140 varies the frequency of the drive signal DSV input to the electromagnetic valves 62, 64, 65 within the frequency domain X set by the domain setting unit 150. Thereby, as compared to a configuration in which the frequency of the drive signal DSV to be input to the electromagnetic valves 62, 64, 65 is fixed to a predetermined value, it is possible to suppress a sound pressure level of a noise, which is caused due to the drive of the electromagnetic valves 62, 64, 65, from increasing. Like this, when varying the frequency of the drive signal DSV within the frequency domain X, the valve control unit 140 changes the frequency of the drive signal DSV by using a map MAP1 shown in FIG. 2.

Figure 2:
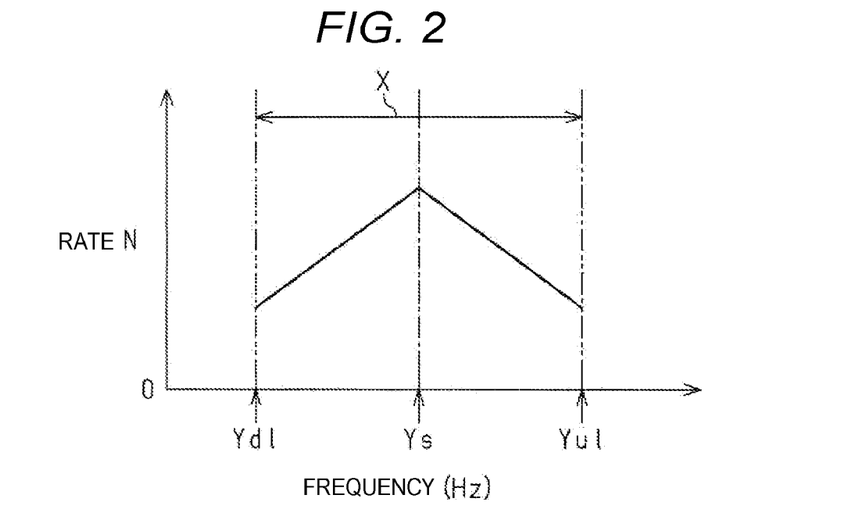
FIG. 2 is a map depicting a relation between a frequency and a rate.

FIG. 2 depicts a relation between a frequency and a rate N. The "rate N" herein described corresponds to the number of times of frequency to be selected per unit time. That is, when the electromagnetic valves 62, 64, 65 are driven, a sum of time periods in which the drive signal DSV of a frequency having a large rate N is input to the electromagnetic valves 62, 64, 65 is greater than a sum of time periods in which the drive signal DSV of a frequency having a small rate N is input to the electromagnetic valves 62, 64, 65.

In this case, as shown in FIG. 2, the rate N that the variation center frequency Ys is selected is greatest in the frequency domain X. Also, in the frequency domain X, the rate N gradually decreases from the variation center frequency Ys toward the variation lower limit frequency Ydl, and also gradually decreases from the variation center frequency Ys toward the variation upper limit frequency Yul. However, the rate N that the variation lower limit frequency Ydl is selected and the rate N that the variation upper limit frequency Yul is selected are all greater than "0".

Figure 3:
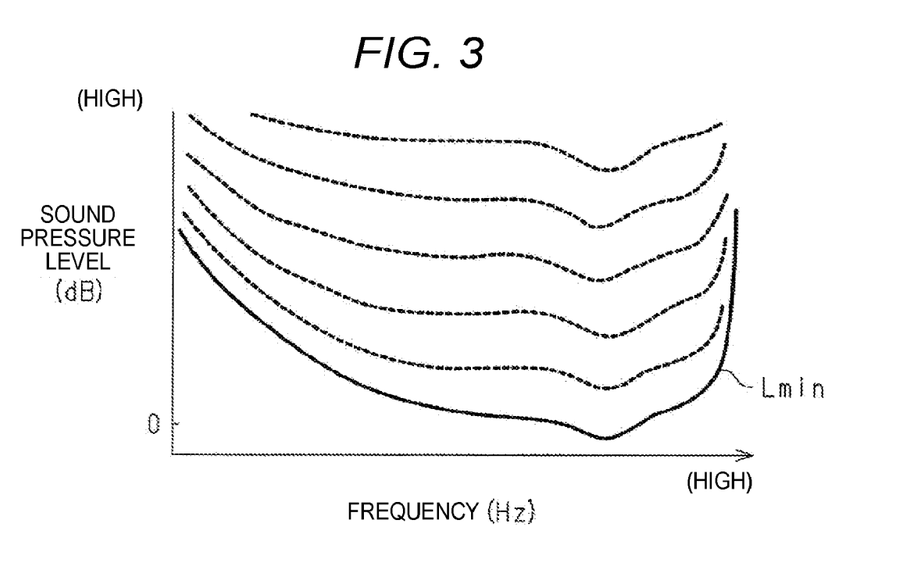
FIG. 3 is a graph depicting equal loudness curves.

FIG. 3 depicts equal loudness curves of ISO226: 2003. The equal loudness curve is obtained by measuring a sound pressure level, at which loudness of a sound and loudness of a noise by human hearing are the same, at each frequency and connecting the same with a contour line. In FIG. 3, an equal loudness curve, which is shown with the solid line, of equal loudness curves shown with the broken and solid lines is a minimum audible field curve Lmin. When sound pressure levels indicated by the minimum audible field curve Lmin are set as prescribed sound pressure levels RSPL, it is almost impossible for the human to hear a noise having a sound pressure level lower than the prescribed sound pressure levels RSPL.

A width of the frequency domain X is set on the basis of the minimum audible field curve Lmin. That is, the width of the frequency domain X, i.e., a difference between the variation lower limit frequency Ydl and the variation upper limit frequency Yul of the frequency domain X is set so that, when the frequency of the drive signal DSV is varied within the frequency domain X, the sound pressure level of the noise at the variation center frequency Ys is not to be much higher than the prescribed sound pressure levels RSPL. When a sound pressure level, which corresponds to the variation center frequency Ys, of the prescribed sound pressure levels RSPL is set as a prescribed center sound pressure level RSPLs, the frequency domain X is set to be wider as the prescribed center sound pressure level RSPLs is lower.

Figure 4:
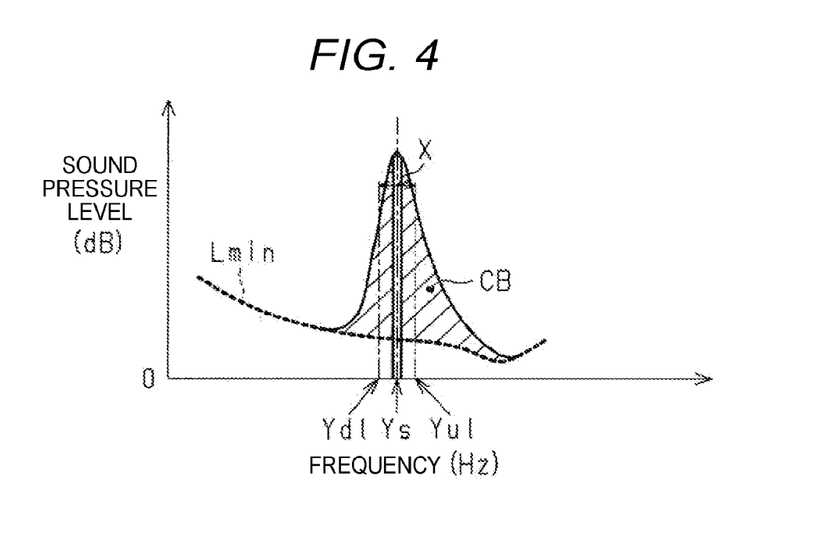
FIG. 4 is a graph pictorially depicting a relation between a critical band of a variation center frequency of a frequency domain and the frequency domain.

For example, as shown in FIG. 4, the width of the frequency domain X is set to be narrower than a critical band CB of the variation center frequency Ys. A noise that is generated from the electromagnetic valves 62, 64, 65 when the drive signal DSV having the same frequency as the variation center frequency Ys is input to the electromagnetic valves 62, 64, 65 is referred to as "noise corresponding to the same frequency as the variation center frequency Ys". In this case, the critical band CB of the variation center frequency Ys is a domain of frequencies that can cancel noises of other frequencies by the spectrum masking effect of the noise corresponding to the same frequency as the variation center frequency Ys. That is, when the frequency of the drive signal DSV to be input to the electromagnetic valves 62, 64, 65 is changed from the same frequency as the variation center frequency Ys to another frequency in the critical band CB, a noise corresponding to another frequency is cancelled by the noise corresponding to the same frequency as the variation center frequency Ys. In the meantime, the "noise corresponding to another frequency" is a noise that is generated from the electromagnetic valves 62, 64, 65 when the drive signal DSV having another frequency is input to the electromagnetic valves 62, 64, 65. That is, in the first embodiment, it can be said that the frequency domain X is set so as to produce the spectrum masking effect of the noise corresponding to the same frequency as the variation center frequency Ys, based on the critical band CB of the variation center frequency Ys.

In the meantime, the critical band CB is determined by the variation center frequency Ys, and the sound pressure level of the noise corresponding to the same frequency as the variation center frequency Ys. Therefore, in the first embodiment, the critical band CB is obtained in advance by a test, a simulation and the like, and the width of the frequency domain X, i.e., the predetermined frequency is set on the basis of the critical band CB.

As described above, when driving the electromagnetic valves 62, 64, 65 by inputting the drive signal DSV to the electromagnetic valves 62, 64, 65, the valve control unit 140 varies the frequency of the drive signal DSV within the frequency domain X set by the domain setting unit 150. Specifically, the valve control unit 140 changes the frequency of the drive signal DSV every prescribed time TM1.

Figure 5:
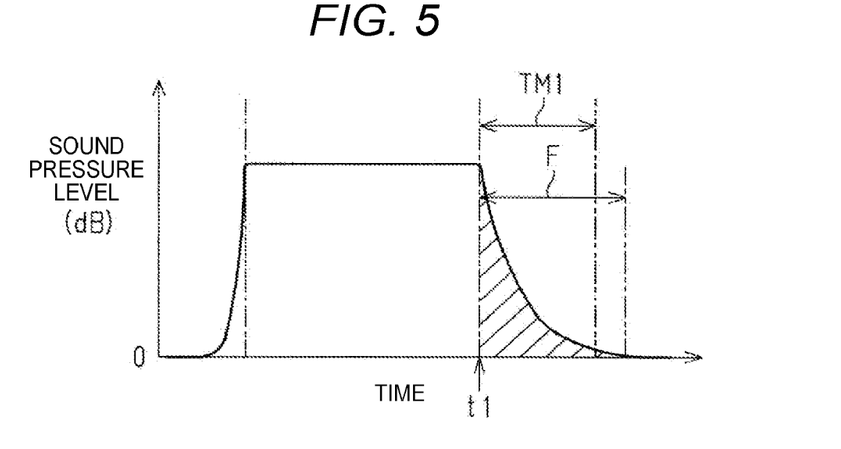
FIG. 5 is a graph depicting a relation between a time period in which a time masking effect can be produced and prescribed time.

FIG. 5 depicts an action when a frequency of a drive signal to be input to an electromagnetic valve is changed in a situation in which the drive signal having the frequency is input to the electromagnetic valve and a noise is thus generated from the electromagnetic valve. As shown in FIG. 5, when the frequency of the drive signal input to the electromagnetic valve is changed at timing t1, a noise corresponding to a changed frequency within a predetermined time period F starting from timing t1 becomes less audible to the human due to the time masking effect of the noise generated from the electromagnetic valve until timing t1. Therefore, as shown in FIG. 5, in the first embodiment, the prescribed time TM1 is set to be shorter than a temporal length of the time period F in which the time masking effect can be produced. That is, it can be said that the prescribed time TM1 is set so as to produce the time masking effect of the noise generated from the electromagnetic valve before the frequency of the drive signal DSV is changed.

Subsequently, a processing routine, which is executed by the control device 100 when driving the differential pressure adjusting valve 62 that is an example of the electromagnetic valve, is described with reference to FIG. 6. In the meantime, a processing routine, which is executed when driving the other electromagnetic valves other than the differential pressure adjusting valve 62, i.e., the holding valve 64 and the pressure reducing valve 65, is equivalent to the processing routine shown in FIG. 6. Therefore, the descriptions of the processing routine for the holding valve 64 and the processing routine for the pressure reducing valve 65 are omitted.

Figure 6:
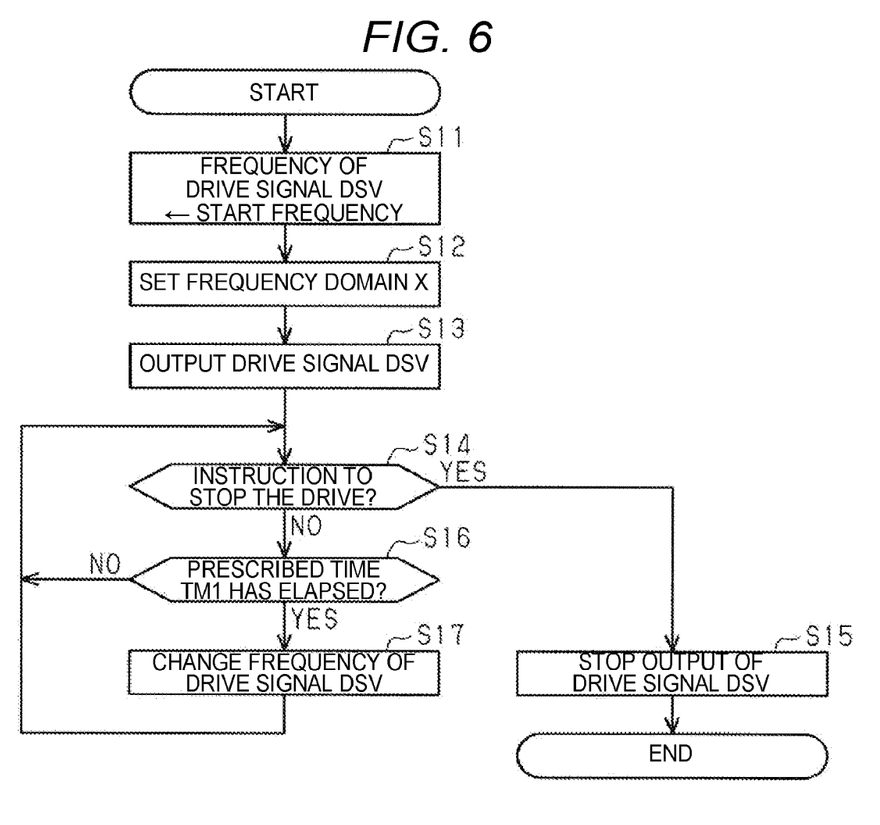
FIG. 6 is a flowchart depicting a processing routine that is to be executed by a control device of the braking device of the first embodiment.

As shown in FIG. 6, when the processing routine is executed, the frequency of the drive signal DSV that is input to the differential pressure adjusting valve 62 is set to the start frequency by the valve control unit 140, first, in step S11. Then, in step S12, the current frequency domain X is set by the domain setting unit 150. Then, in step S13, the drive signal DSV is output to the differential pressure adjusting valve 62 by the valve control unit 140.

Then, in step S14, it is determined whether an instruction to stop the drive of the differential pressure adjusting valve 62 is issued. For example, when it is determined that it is not necessary to control the differential pressure between the master cylinder 51 and the wheel cylinder 21, an instruction to stop the drive of the differential pressure adjusting valve 62 is issued. When the instruction to stop the drive is issued (step S14: YES), the processing proceeds to step S15. Then, in step S15, the output of the drive signal DSV to the differential pressure adjusting valve is stopped by the valve control unit 140. Then, the processing routine is over.

On the other hand, when there is no instruction to stop the drive of the differential pressure adjusting valve 62 (step S14: NO), the processing proceeds to step S16. Then, in step S16, the valve control unit 140 determines whether duration time, in which the drive signal DSV of one frequency in the frequency domain X is input to the differential pressure adjusting valve 62, has reached the prescribed time TM1. When the duration time is shorter than the prescribed time TM1 (step S16: NO), the processing proceeds to step S14 described above. On the other hand, when the duration time is the prescribed time TM1 or longer (step S16: YES), the processing proceeds to step S17.

Then, in step S17, the frequency of the drive signal DSV that is input to the differential pressure adjusting valve 62 is changed within the frequency domain X by the valve control unit 140. At this time, the valve control unit 140 determines a frequency after change by using the map MAP1 shown in FIG. 2, and outputs the drive signal DSV having the frequency after change to the differential pressure adjusting valve 62.

Here, in the processing of step S17, the valve control unit 140 changes the frequency of the drive signal DSV, which is input to the differential pressure adjusting valve 62, in accordance with the map MAP1 and a predetermined rule. The frequency of the drive signal DSV, which is output until the processing proceeds to step S17, is referred to as 'current frequency of the drive signal DSV'. That is, when the current frequency of the drive signal DSV is lower than the variation center frequency Ys of the frequency domain X, the valve control unit 140 changes the frequency of the drive signal DSV to the same frequency as the variation center frequency Ys or to a frequency higher than the variation center frequency Ys, in the frequency domain X. On the other hand, when the current frequency of the drive signal DSV is higher than the variation center frequency Ys of the frequency domain X, the valve control unit 140 changes the frequency of the drive signal DSV to the same frequency as the variation center frequency Ys or to a frequency lower than the variation center frequency Ys, in the frequency domain X. Also, when the current frequency of the drive signal DSV is the same as the variation center frequency Ys of the frequency domain X, the valve control unit 140 changes the frequency of the drive signal DSV to a frequency higher than the variation center frequency Ys, in the frequency domain X, if the previous frequency of the drive signal DSV was lower than the variation center frequency Ys. On the other hand, when the current frequency of the drive signal DSV is the same as the variation center frequency Ys of the frequency domain X, the valve control unit 140 changes the frequency of the drive signal DSV to a frequency lower than the variation center frequency Ys, in the frequency domain X, if the previous frequency of the drive signal DSV was higher than the variation center frequency Ys.

When the processing of step S17 is executed in this way, the processing proceeds to step S14.

Subsequently, when driving the differential pressure adjusting valve 62, operations are described together with effects.

(1) When driving the differential pressure adjusting valve 62, the frequency of the drive signal DSV that is input to the differential pressure adjusting valve 62 is varied within the frequency domain X. As described above, the width of the frequency domain X is set on the basis of the minimum audible field curve Lmin. For this reason, the sound pressure level of the noise that is generated from the differential pressure adjusting valve 62 is difficult to exceed the prescribed sound pressure levels RSPL indicated by the minimum audible field curve Lmin. Therefore, it is possible to prevent the passenger in the vehicle from feeling discomfort, which is caused due to the drive of the differential pressure adjusting valve 62, or to further reduce the feeling of discomfort to be given to the passenger.

(2) Specifically, the frequency domain X is set on the basis of the critical band CB of the variation center frequency Ys of the frequency domain X. For this reason, it is possible to cancel the noise corresponding to the frequency after change by the spectrum masking effect of the noise corresponding to the frequency before change.

(3) Also, when the differential pressure adjusting valve is driven by inputting the drive signal DSV to the differential pressure adjusting valve 62, the frequency of the drive signal DSV is changed every prescribed time TM1, which is set so as to produce the time masking effect of the noise corresponding to the frequency before change. Therefore, the noise corresponding to the frequency after change can be made less audible to the passenger in the vehicle by the time masking effect of the noise corresponding to the frequency before change.

(4) In the first embodiment, when changing the frequency of the drive signal DSV within the frequency domain X, the frequency of the drive signal DSV is changed using the map MAP1 shown in FIG. 2. For this reason, a sum of time periods in which the drive signal DSV having a frequency close to the variation center frequency Ys is input to the differential pressure adjusting valve 62 becomes greater than a sum of time periods in which the drive signal DSV having a frequency distant from the variation center frequency Ys is input to the differential pressure adjusting valve 62. As a result, the spectrum masking effect of the noise corresponding to the variation center frequency Ys can prevent a reduction in the effect that makes, less audible to the passenger in the vehicle, the noises corresponding to the other frequencies than the variation center frequency Ys in the frequency domain X.

In the meantime, as one of the methods of suppressing the effect from being lowered, a method of varying the frequency of the drive signal DSV only in the vicinity of the variation center frequency Ys even in the frequency domain X is considered. In this case, the rate that the drive signal DSV of any frequency is input to the differential pressure adjusting valve 62 increases, and the sound pressure level of the noise corresponding to the frequency is likely to increase. In this respect, in the first embodiment, even when the rate is small, a chance of inputting the drive signal DSV having a frequency, which is not close to the variation center frequency Ys, i.e., is close to the variation upper limit frequency Yul or the variation lower limit frequency Ydl, to the differential pressure adjusting valve 62 is provided, so that it is possible to suppress the sound pressure level of the noise corresponding to the frequency close to the variation center frequency Ys from excessively increasing.

(5) Also, even in the frequency domain X, a frequency domain may be classified into a first domain in which the noise, generated from the differential pressure adjusting valve 62, is less audible to the passenger in the vehicle but responsiveness of the differential pressure adjusting valve 62 is not very good, and a second domain in which the noise, generated from the differential pressure adjusting valve 62, is easily audible to the passenger in the vehicle but the responsiveness of the differential pressure adjusting valve 62 is good. When a domain, which is lower than the variation center frequency Ys, of the frequency domain X is one of the first domain and the second domain and a domain higher than the variation center frequency Ys is the other of the first domain and the second domain, it is possible to alternately repeat a time period, in which the responsiveness of the differential pressure adjusting valve 62 is not very good but the noise is less audible to the passenger in the vehicle, and a time period, in which the responsiveness of the differential pressure adjusting valve 62 is good but the noise is easily audible to the passenger in the vehicle, by varying the frequency of the drive signal DSV within the frequency domain X in accordance with the rule. That is, it is possible both to prevent a reduction in the responsiveness of the differential pressure adjusting valve 62 and to make the noise less audible to the passenger in the vehicle.

For information, in the first embodiment, even when driving the other electromagnetic valves 64, 65, rather than the differential pressure adjusting valve 62, the frequency of the drive signal DSV to be input to the electromagnetic valves 64, 65 is varied in the same manner as the case of driving the differential pressure adjusting valve 62. For this reason, even when driving the electromagnetic valves 64, 65, it is possible to achieve the same operational effects as the case of driving the differential pressure adjusting valve 62.

Second Embodiment

Subsequently, a second embodiment of the braking device for a vehicle is described with reference to FIGS. 7 to 9. The second embodiment is different from the first embodiment, in that the frequency domain is switched during the drive of the electromagnetic valve, for example. Therefore, hereinbelow, differences from the first embodiment are mainly described, the members, which are the same as or equivalent to the first embodiment, are denoted with the same reference numerals, and the overlapping descriptions are omitted.

Figure 7:
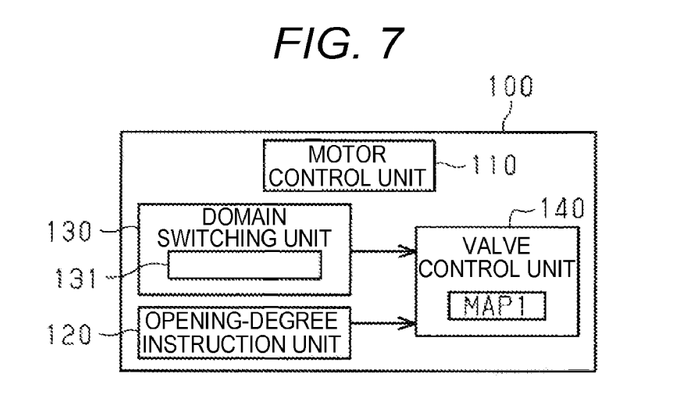
FIG. 7 depicts a functional configuration of a control device of a braking device for a vehicle of a second embodiment.
Figure 8:
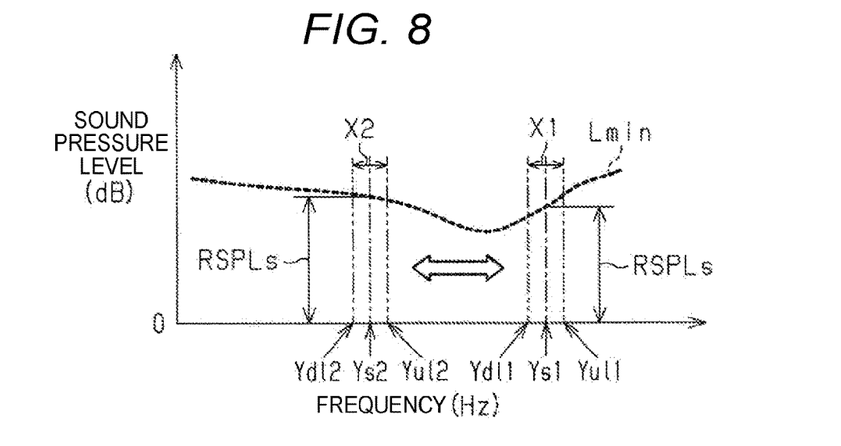
FIG. 8 is a graph depicting a relation between a first frequency domain and a second frequency domain.

As shown in FIG. 7, the control device 100 includes, as functional units for controlling the braking actuator 60, the motor control unit 110, the opening-degree instruction unit 120, a domain switching unit 130, and the valve control unit 140.

The domain switching unit 130 switches the frequency domain X every switching time TM2 while the differential pressure adjusting valve 62, the holding valve 64 and the pressure reducing valve 65 are driven. The switching time TM2 is the same as the temporal length of "switching cycle" and is longer than the prescribed time TM1.

That is, in a domain storage 131 of the domain switching unit 130, a plurality of (two, in the second embodiment) frequency domains X1, X2 are stored in advance, as the frequency domain X. The first frequency domain X1 of the frequency domains X1, X2 is set as a frequency domain higher than the second frequency domain X2. A variation lower limit frequency of the first frequency domain X1 is referred to as 'variation lower limit frequency Ydl1', a variation upper limit frequency of the first frequency domain X1 is referred to as 'variation upper limit frequency Yul1', a variation lower limit frequency of the second frequency domain X2 is referred to as 'variation lower limit frequency Ydl2', and a variation upper limit frequency of the second frequency domain X2 is referred to as 'variation upper limit frequency Yul2'. In this case, as shown in FIG. 8, the variation lower limit frequency Ydl1 of the first frequency domain X1 is higher than the variation upper limit frequency Yul2 of the second frequency domain X2.

In the second embodiment, the two frequency domains X1, X2 are set in advance but widths of the frequency domains X1, X2 are the same. For example, as shown in FIG. 8, when a prescribed center sound pressure level RSPLs corresponding to a variation center frequency Ys1 of the first frequency domain X1 is lower than a prescribed center sound pressure level RSPLs corresponding to a variation center frequency Ys2 of the second frequency domain X2, the widths of the frequency domains X1, X2 are respectively set, in conformity with the prescribed center sound pressure level RSPLs corresponding to the variation center frequency Ys1 of the first frequency domain X1. For this reason, it can be said that the width of the second frequency domain X2 is set slightly wide with respect to the prescribed center sound pressure level RSPLs corresponding to the variation center frequency Ys2 of the second frequency domain X2.

Also, the widths of the frequency domains X1, X2 are respectively set to be narrower than the critical band CB of the variation center frequency Ys (refer to FIG. 5). That is, in the second embodiment, the widths of the frequency domains X1, X2 are respectively set narrower than the critical band CB of the variation center frequency Ys1 of the first frequency domain X1. Therefore, it can be said that the first frequency domain X1 is set so as to produce the spectrum masking effect of the noise corresponding to the same frequency as the variation center frequency Ys1, based on the critical band CB of the variation center frequency Ys1. Likewise, it can be said that the second frequency domain X2 is set so as to produce the spectrum masking effect of the noise corresponding to the same frequency as the variation center frequency Ys2, based on the critical band CB of the variation center frequency Ys2.

Subsequently, a processing routine, which is executed by the control device 100 when driving the differential pressure adjusting valve 62 that is an example of the electromagnetic valve, is described with reference to FIG. 9. In the meantime, a processing routine, which is executed when driving the other electromagnetic valves other than the differential pressure adjusting valve 62, i.e., the holding valve 64 and the pressure reducing valve 65, is equivalent to the processing routine shown in FIG. 9. Therefore, the descriptions of the processing routine for the holding valve 64 and the processing routine for the pressure reducing valve 65 are omitted.

Figure 9:
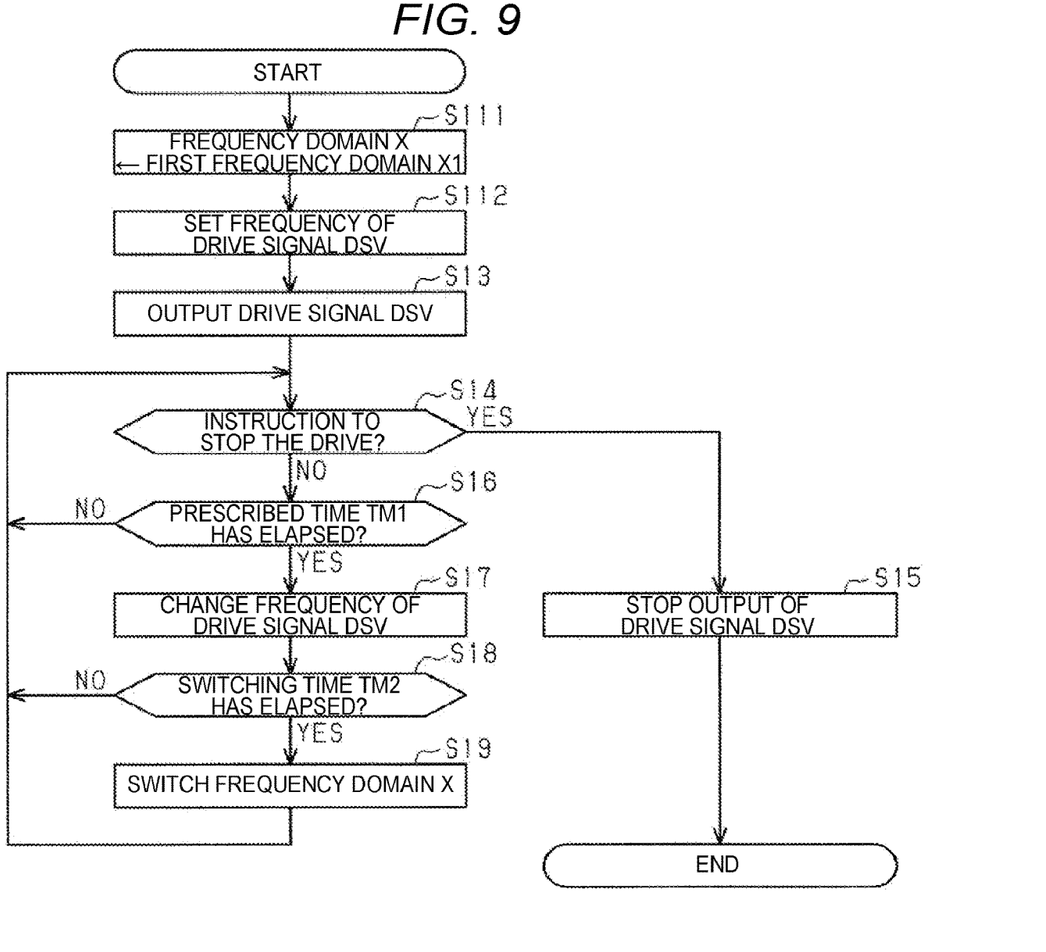
FIG. 9 is a flowchart depicting a processing routine that is to be executed by the control device of the braking device of the second embodiment.

As shown in FIG. 9, when the processing routine is executed, first, the first frequency domain X1 is selected as the frequency domain X by the domain switching unit 130, in step S111. Meanwhile, in step S111, the second frequency domain X2 may be selected as the frequency domain X. Subsequently, in step S112, the frequency of the drive signal DSV that is to be input to the differential pressure adjusting valve 62 is set to a frequency in the frequency domain X by the valve control unit 140. For example, the frequency of the drive signal DSV may be set to be the same as the variation center frequency Ys of the selected frequency domain X or to be a frequency different from the variation center frequency Ys. Then, the processing proceeds to step S13 described above.

When the differential pressure adjusting valve 62 is driven, the respective processing of step S14, step S16 and step S17 is executed, like the first embodiment. Then, in the second embodiment, when the processing of step S17 is executed, the processing proceeds to step S18.

In step S18, the domain switching unit 130 determines whether elapsed time after the frequency domain X is selected has reached the switching time TM2. When it is determined that the elapsed time has not reached the switching time TM2 (step S18: NO), the processing proceeds to step S14 described above.

On the other hand, when it is determined that the elapsed time has reached the switching time TM2 (step S18: YES), the processing proceeds to step S19. Then, in step S19, the frequency domain X is switched by the domain switching unit 130. Specifically, when the frequency domain X before switching is the first frequency domain X1, the domain switching unit 130 changes the frequency domain X to the second frequency domain X2. On the other hand, when the frequency domain X before switching is the second frequency domain X2, the domain switching unit 130 changes the frequency domain X to the first frequency domain X1. Therefore, in the second embodiment, when the current frequency domain (in this case, the first frequency domain X1) is a higher frequency domain than the previous frequency domain (for example, the second frequency domain X2), the domain switching unit 130 switches a next frequency domain to a frequency domain (in this case, the second frequency domain X2) lower than the current frequency domain. On the other hand, when the current frequency domain (in this case, the second frequency domain X2) is a lower frequency domain than the previous frequency domain (for example, the first frequency domain X1), the domain switching unit 130 switches a next frequency domain to a frequency domain (in this case, the first frequency domain X1) higher than the current frequency domain.

According to the second embodiment, it is possible to further achieve following operational effects, in addition to the operational effects described in the above (1) to (5).

(6) In order to make, less audible to the passenger in the vehicle, the noise generated from the differential pressure adjusting valve 62, it is preferable to vary the frequency of the drive signal DSV within the frequency domain X set to a range in which the prescribed sound pressure levels RSPL are high. However, when inputting the drive signal DSV having the frequency, which is included in the frequency domain X set to a range in which the prescribed sound pressure levels RSPL are high, to the differential pressure adjusting valve 62, the responsiveness of the differential pressure adjusting valve 62 may not be good. Also, when the frequency of the drive signal DSV is varied within the frequency domain X set to a range in which the prescribed sound pressure levels RSPL are low, the noise is easily audible to the passenger in the vehicle but the responsiveness of the differential pressure adjusting valve 62 may be good.

For example, it is assumed that one of the first frequency domain X1 and the second frequency domain X2 is a frequency domain in which the responsiveness of the differential pressure adjusting valve 62 is not very good but the noise is less audible to the passenger in the vehicle, and the other is a frequency domain in which the responsiveness of the differential pressure adjusting valve 62 is good but the noise is easily audible to the passenger in the vehicle. In this case, when the frequency domain X is switched with a predetermined switching cycle, like the second embodiment, it is possible to alternately repeat a time period, in which the responsiveness of the differential pressure adjusting valve 62 is not very good but the noise is less audible to the passenger in the vehicle, and a time period, in which the responsiveness of the differential pressure adjusting valve 62 is good but the noise is easily audible to the passenger in the vehicle. That is, it is possible both to prevent a reduction in the responsiveness of the differential pressure adjusting valve 62 and to make the noise less audible to the passenger in the vehicle.

For information, in the second embodiment, even when driving the other electromagnetic valves 64, 65, rather than the differential pressure adjusting valve 62, the frequency of the drive signal DSV to be input to the electromagnetic valves 64, 65 is varied in the same manner as the case of driving the differential pressure adjusting valve 62. For this reason, even when driving the electromagnetic valves 64, 65, it is possible to achieve the same operational effects as the case of driving the differential pressure adjusting valve 62.

In the meantime, the respective embodiments can be changed into following embodiments.

In the respective embodiments, in step S17, the frequency of the drive signal DSV is varied within the frequency domain X, based on the map MAP1. However, the frequency of the drive signal DSV may be varied in accordance with a rule different from the above-described rule. For example, when the drive signal DSV having a frequency lower than the variation center frequency Ys in the frequency domain X is input to the electromagnetic valve, a next frequency of the drive signal DSV may be changed to a frequency lower than the variation center frequency Ys if the frequency is different from the next frequency. Also, when the drive signal DSV having a frequency higher than the variation center frequency Ys in the frequency domain X is input to the electromagnetic valve, a next frequency of the drive signal DSV may be changed to a frequency higher than the variation center frequency Ys if the frequency is different from the next frequency.

In the second embodiment, in the domain storage 131, three or more frequency domains that can be selected by the domain switching unit 130 may be stored. In this case, the domain storage 131 selects the frequency domain X from the three or more frequency domains stored in the domain storage 131, in accordance with a predetermined rule. As the rule, a rule that when a current frequency domain is a higher frequency domain than a previous frequency domain, a next frequency domain is switched to a lower frequency domain than the current frequency domain, and when a current frequency domain is a lower frequency domain than a previous frequency domain, a next frequency domain is switched to a higher frequency domain than the current frequency domain may be adopted, for example. Also, as the rule, a rule of switching the frequency domain in sequence from a low frequency domain to a high frequency domain may be adopted, for example.

In the second embodiment, the width of the second frequency domain X2 may be set different from the width of the first frequency domain X1. For example, the width of the first frequency domain X1 may be set on the basis of the prescribed center sound pressure level RSPLs at the variation center frequency Ys1 of the first frequency domain X1, and the width of the second frequency domain X2 may be set on the basis of the prescribed center sound pressure level RSPLs at the variation center frequency Ys2 of the second frequency domain X2. In this case, when the prescribed center sound pressure level RSPLs at the variation center frequency Ys1 is different from the prescribed center sound pressure level RSPLs at the variation center frequency Ys2, the width of the second frequency domain X2 becomes different from the width of the first frequency domain X1.

According to the above configuration, the width of the frequency domain set to the range in which the prescribed sound pressure levels RSPL are low is greater than the width of the frequency domain set to the range in which the prescribed sound pressure levels RSPL are high. For this reason, even in the case that the frequency of the drive signal DSV is varied within the frequency domain set to the range in which the prescribed sound pressure levels RSPL are low, since the frequency domain is relatively wide, it is possible to make, less audible to the passenger in the vehicle, the noise caused due to the drive of the electromagnetic valves 62, 64, 65.

In the second embodiment, the variation lower limit frequency Ydl1 of the first frequency domain X1 may coincide with the variation upper limit frequency Yul2 of the second frequency domain X2.

In the second embodiment, at least apart of one frequency domain X of the plurality of frequency domains X may overlap the other frequency domain. For example, the variation lower limit frequency Ydl1 of the first frequency domain X1 may be lower than the variation upper limit frequency Yul2 of the second frequency domain X2, and the variation lower limit frequency Ydl1 of the first frequency domain X1 may higher than the variation lower limit frequency Ydl2 of the second frequency domain X2.

Figure 10:
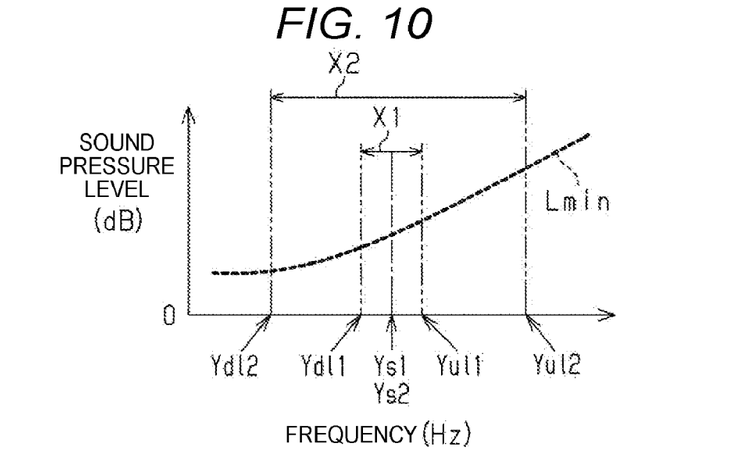
FIG. 10 is a graph depicting a relation between a first frequency domain and a second frequency domain, in a braking device for a vehicle of another embodiment.

Also, as shown in FIG. 10, the variation lower limit frequency Ydl1 of the first frequency domain X1 may be higher than the variation lower limit frequency Ydl2 of the second frequency domain X2, and the variation upper limit frequency Yul1 of the first frequency domain X1 may be lower than the variation upper limit frequency Yul2 of the second frequency domain X2. In this case, the first frequency domain X1 may be set so that the variation center frequency Ys1 is the same as the variation center frequency Ys2 of the second frequency domain X2 or the variation center frequency Ys1 is different from the variation center frequency Ys2.

Like this, in the case that the first frequency domain X1 is included in the second frequency domain X2, when a noise (for example, a traveling sound that is generated when a vehicle travels) other than the operating sound of the braking actuator 60 is generated, the first frequency domain X1 may be selected, and the frequency of the drive signal DSV may be varied within the first frequency domain X1. On the other hand, when the other noise is not generated (for example, the vehicle is stopped, so that the traveling sound is not generated), the second frequency domain X2 may be selected, and the frequency of the drive signal DSV may be varied within the second frequency domain X2.

In the second embodiment, one frequency domain X of the plurality of frequency domains X may be a domain for fixing the frequency of the drive signal DSV. That is, in an example of FIG. 11, when the first frequency domain X1 is selected, the frequency of the drive signal DSV is varied within the first frequency domain X1. However, when the second frequency domain X2 is selected, the frequency of the drive signal DSV is kept at the variation center frequency Ys2 of the second frequency domain X2.

Figure 11:
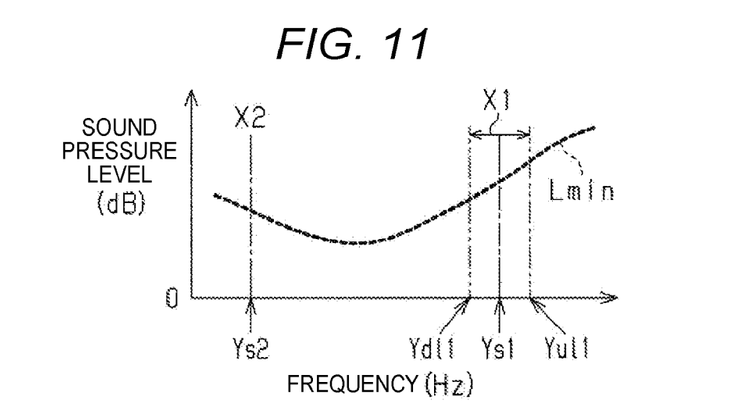
FIG. 11 is a graph depicting a relation between the first frequency domain and the second frequency domain, in a braking device for a vehicle of another embodiment.

In the meantime, in the case that the example of FIG. 11 is adopted, when a predetermined selection condition is satisfied, the second frequency domain X2 may be selected so that the frequency of the drive signal DSV is not to be varied, and when the selection condition is not satisfied, the first frequency domain X1 may be selected so that the frequency of the drive signal DSV is to be varied within the first frequency domain X1. That is, as a control mode that is to be executed by the valve control unit 140, a variation mode of varying the frequency of the drive signal DSV within the first frequency domain X1 and a fixing mode of fixing the frequency of the drive signal DSV to one frequency outside the first frequency domain X1 may be selected.

In the second embodiment, the frequency domain X is switched every switching cycle. However, the present invention is not limited thereto. For example, the frequency domain X may be switched using, as a trigger, a change in the traveling state of the vehicle (for example, a change from a traveling state to a stop state) or a change in the speed of the vehicle body.

In the second embodiment, the start frequency may be first determined and the first frequency domain X1 may be set on the basis of the start frequency. When the first frequency domain X1 is set in this way, the second frequency domain X2 is set on the basis of the first frequency domain X1.

In the first embodiment, the start frequency is first determined, and the frequency domain X is set on the basis of the start frequency. However, the present invention is not limited thereto. For example, a preset frequency in the frequency domain X may be selected as the start frequency.

In the case that the width of the frequency domain X is set so that the sound pressure level of the noise does not exceed the prescribed sound pressure levels RSPL when the electromagnetic valves 62, 64, 65 are driven, the prescribed time TM1 may be set without considering the time masking effect.

In the case that the sound pressure level of the noise does not exceed the prescribed sound pressure levels RSPL when the electromagnetic valves 62, 64, 65 are driven, the width of the frequency domain X may be set without considering the spectrum masking effect of the noise corresponding to the same frequency as the variation center frequency Ys.

Figure 12:
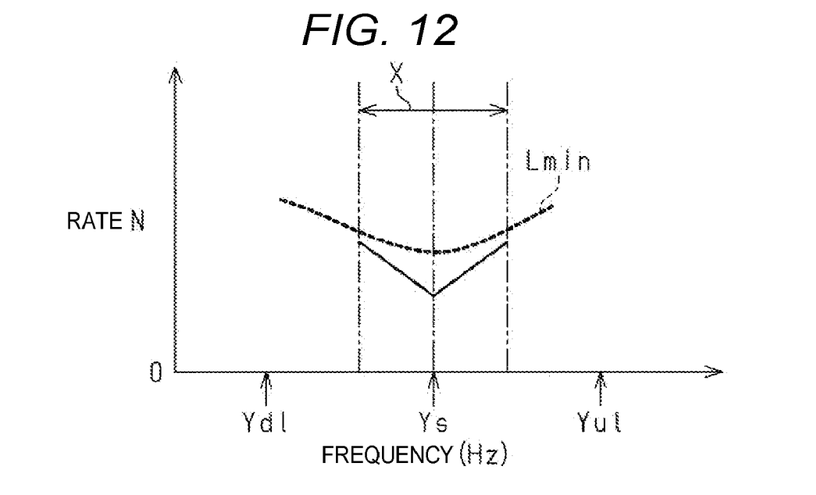
FIG. 12 is a map depicting a relation between the frequency and the rate, in a braking device for a vehicle of another embodiment.

In order to prevent the sound pressure level of the noise from exceeding the prescribed sound pressure levels RSPL when the electromagnetic valves 62, 64, 65 are driven, the frequency of the drive signal DSV may be varied using a map shown in FIG. 12. In FIG. 12, the map indicative of a relation between the frequency and the rate N is shown with the solid line, and the minimum audible field curve Lmin is shown with the broken line. In the map of FIG. 12, in the frequency domain X, the rate N of a frequency at which the prescribed sound pressure level RSPL indicated by the minimum audible field curve Lmin is low is small, and the rate N of a frequency at which the prescribed sound pressure level RSPL is high is large. When the frequency of the drive signal DSV is varied using the map, the sound pressure level of the noise, which corresponds to the frequency at which the prescribed sound pressure level RSPL is low, is difficult to increase. For this reason, it is possible to make the sound pressure level of the noise, which is caused due to the drive of the electromagnetic valves 62, 64, 65, less than the prescribed sound pressure level RSPL.

In the braking actuator 60, the electric motor 67 is driven by the PWM control. For this reason, even in a case in which the electric motor 67 is driven, the frequency of the drive signal DSV to be input to the electric motor 67 may be varied within the frequency domain set on the basis of the minimum audible field curve Lmin. In this case, the motor control unit 110 functions as an example of "target control unit".

The invention claimed is:

1. A braking device for a vehicle configured to adjust a braking force for the vehicle, the braking device comprising:
    an electric control target including at least one of electromagnetic valves and an electric motor, and
    a target control unit configured to drive the electric control target by pulse width control, wherein
    when driving the electric control target by inputting a drive signal to the electric control target, the target control unit varies a frequency of the drive signal within a frequency domain,
    when a frequency that is a center of the frequency domain is set as a variation center frequency, a sound pressure level of a noise which is indicated by a minimum audible field curve among equal loudness curves is set as a prescribed sound pressure level, and the prescribed sound pressure level which corresponds to the variation center frequency is set as a prescribed center sound pressure level, and the target control unit is configured to
   set a width of the frequency domain to be wider as the prescribed center sound pressure level decreases and vary the frequency of the drive signal within the frequency domain so that a rate at which each frequency is selected within the frequency domain is greater than "0," or
   vary the frequency of the drive signal within the frequency domain so that a rate at which the drive signal of the frequency with a prescribed sound pressure level below a predetermined value is input to the electric control target is smaller than a rate at which the drive signal of the frequency with a prescribed sound pressure level above the predetermined value is input to the electric control target in order to prevent the sound pressure level of the noise generated in the electric control target from exceeding the prescribed sound pressure level.

2. The braking device for a vehicle according to claim 1, wherein
   when a domain of frequencies that can cancel noises of other frequencies by a spectrum masking effect of the noise corresponding to the same frequency as the variation center frequency, is set as a critical band of the variation center frequency, the frequency domain is set so as to produce the spectrum masking effect of a noise, which is generated from the electric control target when the drive signal having the same frequency as the variation center frequency is input to the electric control target, based on the critical band of the variation center frequency.

3. The braking device for a vehicle according to claim 2, wherein
   when driving the electric control target by inputting the drive signal to the electric control target, the target control unit makes a rate that the drive signal with a frequency being distant from the variation center frequency in the frequency domain is input to the electric control target smaller than a rate that the drive signal with a frequency being close to the variation center frequency in the frequency domain is input to the electric control target.

4. The braking device for a vehicle according to claim 1, wherein
   when driving the electric control target by inputting the drive signal to the electric control target, the target control unit changes the frequency of the drive signal within the frequency domain every prescribed time, and
   the prescribed time is set so as to produce a time masking effect of a noise, which is generated from the electric control target before the frequency of the drive signal is changed.

5. The braking device for a vehicle according to claim 2, wherein
   in the case of driving the electric control target by inputting the drive signal to the electric control target,
   when the drive signal having a frequency lower than the variation center frequency in the frequency domain is input to the electric control target, the target control unit changes the frequency of the drive signal to the same frequency as the variation center frequency or to a frequency higher than the variation center frequency in the frequency domain, and
   when the drive signal having a frequency higher than the variation center frequency in the frequency domain is input to the electric control target, the target control unit changes the frequency of the drive signal to the same frequency as the variation center frequency or to a frequency lower than the variation center frequency in the frequency domain.

6. The braking device for a vehicle according to claim 1, further comprising a domain switching unit configured to switch the frequency domain every switching cycle, wherein
   when a current frequency domain is a higher frequency domain than a previous frequency domain, the domain switching unit switches a next frequency domain to a lower frequency domain than the current frequency domain, and
   when the current frequency domain is a lower frequency domain than the previous frequency domain, the domain switching unit switches the next frequency domain to a higher frequency domain than the current frequency domain.

7. The braking device for a vehicle according to claim 2, wherein
   when driving the electric control target by inputting the drive signal to the electric control target, the target control unit changes the frequency of the drive signal within the frequency domain every prescribed time, and
   the prescribed time is set so as to produce a time masking effect of a noise, which is generated from the electric control target before the frequency of the drive signal is changed.

8. The braking device for a vehicle according to claim 3, wherein
   when driving the electric control target by inputting the drive signal to the electric control target, the target control unit changes the frequency of the drive signal within the frequency domain every prescribed time, and
   the prescribed time is set so as to produce a time masking effect of a noise, which is generated from the electric control target before the frequency of the drive signal is changed.

9. The braking device for a vehicle according to claim 3, wherein
   in the case of driving the electric control target by inputting the drive signal to the electric control target,
   when the drive signal having a frequency lower than the variation center frequency in the frequency domain is input to the electric control target, the target control unit changes the frequency of the drive signal to the same frequency as the variation center frequency or to a frequency higher than the variation center frequency in the frequency domain, and
   when the drive signal having a frequency higher than the variation center frequency in the frequency domain is input to the electric control target, the target control unit changes the frequency of the drive signal to the same frequency as the variation center frequency or to a frequency lower than the variation center frequency in the frequency domain.

10. The braking device for a vehicle according to claim 2, further comprising a domain switching unit configured to switch the frequency domain every switching cycle, wherein
   when a current frequency domain is a higher frequency domain than a previous frequency domain, the domain switching unit switches a next frequency domain to a lower frequency domain than the current frequency domain, and
   when the current frequency domain is a lower frequency domain than the previous frequency domain, the domain switching unit switches the next frequency domain to a higher frequency domain than the current frequency domain.

11. The braking device for a vehicle according to claim 3, further comprising a domain switching unit configured to switch the frequency domain every switching cycle, wherein
when a current frequency domain is a higher frequency domain than a previous frequency domain, the domain switching unit switches a next frequency domain to a lower frequency domain than the current frequency domain, and
when the current frequency domain is a lower frequency domain than the previous frequency domain, the domain switching unit switches the next frequency domain to a higher frequency domain than the current frequency domain.

12. The braking device for a vehicle according to claim 4, further comprising a domain switching unit configured to switch the frequency domain every switching cycle, wherein
when a current frequency domain is a higher frequency domain than a previous frequency domain, the domain switching unit switches a next frequency domain to a lower frequency domain than the current frequency domain, and
when the current frequency domain is a lower frequency domain than the previous frequency domain, the domain switching unit switches the next frequency domain to a higher frequency domain than the current frequency domain.

13. The braking device for a vehicle according to claim 7, further comprising a domain switching unit configured to switch the frequency domain every switching cycle, wherein
when a current frequency domain is a higher frequency domain than a previous frequency domain, the domain switching unit switches a next frequency domain to a lower frequency domain than the current frequency domain, and
when the current frequency domain is a lower frequency domain than the previous frequency domain, the domain switching unit switches the next frequency domain to a higher frequency domain than the current frequency domain.

14. The braking device for a vehicle according to claim 8, further comprising a domain switching unit configured to switch the frequency domain every switching cycle, wherein
when a current frequency domain is a higher frequency domain than a previous frequency domain, the domain switching unit switches a next frequency domain to a lower frequency domain than the current frequency domain, and
when the current frequency domain is a lower frequency domain than the previous frequency domain, the domain switching unit switches the next frequency domain to a higher frequency domain than the current frequency domain.

15. The braking device for a vehicle according to claim 5, further comprising a domain switching unit configured to switch the frequency domain every switching cycle, wherein
when a current frequency domain is a higher frequency domain than a previous frequency domain, the domain switching unit switches a next frequency domain to a lower frequency domain than the current frequency domain, and
when the current frequency domain is a lower frequency domain than the previous frequency domain, the domain switching unit switches the next frequency domain to a higher frequency domain than the current frequency domain.

16. The braking device for a vehicle according to claim 9, further comprising a domain switching unit configured to switch the frequency domain every switching cycle, wherein
when a current frequency domain is a higher frequency domain than a previous frequency domain, the domain switching unit switches a next frequency domain to a lower frequency domain than the current frequency domain, and
when the current frequency domain is a lower frequency domain than the previous frequency domain, the domain switching unit switches the next frequency domain to a higher frequency domain than the current frequency domain.

17. The braking device for a vehicle according to claim 10, wherein
when a frequency that is a center of the frequency domain is set as a variation center frequency, and a sound pressure level, which corresponds to the variation center frequency, of sound pressure levels indicated by the minimum audible field curve is set as a prescribed center sound pressure level, a width of the frequency domain in which the prescribed center sound pressure level is low is greater than a width of the frequency domain in which the prescribed center sound pressure level is high.

18. The braking device for a vehicle according to claim 11, wherein
when a frequency that is a center of the frequency domain is set as a variation center frequency, and a sound pressure level, which corresponds to the variation center frequency, of sound pressure levels indicated by the minimum audible field curve is set as a prescribed center sound pressure level, a width of the frequency domain in which the prescribed center sound pressure level is low is greater than a width of the frequency domain in which the prescribed center sound pressure level is high.

19. The braking device for a vehicle according to claim 12, wherein
when a frequency that is a center of the frequency domain is set as a variation center frequency, and a sound pressure level, which corresponds to the variation center frequency, of sound pressure levels indicated by the minimum audible field curve is set as a prescribed center sound pressure level, a width of the frequency domain in which the prescribed center sound pressure level is low is greater than a width of the frequency domain in which the prescribed center sound pressure level is high.

* * * * *